United States Patent
Beele (10) Patent No.: US 11,721,962 B2
(45) Date of Patent: Aug. 8, 2023

(54) SYSTEM AND METHOD FOR PROVIDING A CONDUIT SEALINGLY TO A THROUGH-OPENING IN A PLATE-SHAPED CONSTRUCTION ELEMENT

(71) Applicant: Beele Engineering B.V., Aalten (NL)

(72) Inventor: Johannes Alfred Beele, Aalten (NL)

(73) Assignee: Beele Engineering B.V., Aalten (NL)

( * ) Notice: Subject to any disclaimer, the term of this patent is extended or adjusted under 35 U.S.C. 154(b) by 278 days.

(21) Appl. No.: 16/649,220

(22) PCT Filed: Sep. 20, 2018

(86) PCT No.: PCT/EP2018/075538
§ 371 (c)(1),
(2) Date: Mar. 20, 2020

(87) PCT Pub. No.: WO2019/057855
PCT Pub. Date: Mar. 28, 2019

(65) Prior Publication Data
US 2020/0251893 A1   Aug. 6, 2020

(30) Foreign Application Priority Data
Sep. 20, 2017 (NL) ...................... 2019583

(51) Int. Cl.
*H02G 3/22* (2006.01)
*F16L 5/08* (2006.01)
(Continued)

(52) U.S. Cl.
CPC .................. *H02G 3/22* (2013.01); *F16L 5/08* (2013.01); *F16L 5/04* (2013.01); *F16L 5/10* (2013.01); *F16L 5/14* (2013.01); *H02G 15/013* (2013.01)

(58) Field of Classification Search
CPC . H02G 15/013; H02G 3/22; F16L 5/14; F16L 5/10; F16L 5/04; F16L 5/08
See application file for complete search history.

(56) References Cited

U.S. PATENT DOCUMENTS 1,689,575 A    10/1928  Winn
4,993,724 A *   2/1991  Hauff .................. F16L 5/14
                                                      277/606
(Continued)

FOREIGN PATENT DOCUMENTS

DE    202008001842 U1    4/2008
GB          480021 A     2/1938
(Continued)

OTHER PUBLICATIONS

International Search Report and Written Opinion dated Dec. 4, 2018 in connection with International Application No. PCT/EP2018/075538.
(Continued)

*Primary Examiner* — Eugene G Byrd
(74) *Attorney, Agent, or Firm* — Wolf, Greenfield & Sacks, P.C.

(57) ABSTRACT

System for providing a conduit sealingly to a through-opening in a plate-shaped construction element so that at least one pipe and/or cable can extend through the conduit and so that after sealing remaining space in the conduit a completely sealed-off pipe and/or cable penetration through the plate-shaped construction element is obtained, wherein the system is such that it is mechanically mountable, wherein the system is further such that it is mountable from only one side of the plate-shaped construction element, by only one worker.

41 Claims, 6 Drawing Sheets

(51) Int. Cl.
*F16L 5/04* (2006.01)
*F16L 5/10* (2006.01)
*F16L 5/14* (2006.01)
*H02G 15/013* (2006.01)

(56) References Cited

U.S. PATENT DOCUMENTS

| | | | | |
|---|---|---|---|---|
| 5,366,318 A | * | 11/1994 | Brancher | E03F 5/02 |
| | | | | 285/236 |
| 6,141,915 A | * | 11/2000 | Andersen | H02G 3/22 |
| | | | | 52/220.8 |
| 2008/0164435 A1 | * | 7/2008 | Descutner | B65D 90/00 |
| | | | | 251/144 |
| 2010/0284133 A1 | * | 11/2010 | Skryten | H02G 3/22 |
| | | | | 361/679.01 |
| 2011/0048798 A1 | * | 3/2011 | Mazelle | H02G 15/013 |
| | | | | 174/665 |
| 2012/0224933 A1 | * | 9/2012 | Anderson | H02G 3/0675 |
| | | | | 411/313 |
| 2013/0213546 A1 | * | 8/2013 | Cichon, Jr. | H02G 3/22 |
| | | | | 156/60 |
| 2014/0209377 A1 | * | 7/2014 | Wang | H02G 15/013 |
| | | | | 174/658 |
| 2016/0268790 A1 | * | 9/2016 | Panfil | F16J 15/14 |

FOREIGN PATENT DOCUMENTS

| | | |
|---|---|---|
| GB | 595584 A | 12/1947 |
| GB | 833028 A | 4/1960 |
| JP | 3018177 B1 | 3/2000 |
| JP | 2000130646 A | 5/2000 |
| KR | 970055372 U | 10/1997 |
| KR | 200159689 Y1 | 11/1999 |
| KR | 20070013195 A | 1/2007 |
| WO | WO 2009/097842 A1 | 8/2009 |

OTHER PUBLICATIONS

International Preliminary Report on Patentability dated Oct. 31, 2019 in connection with International Application No. PCT/EP2018/075538.

* cited by examiner

SECTION A-A

SECTION B-B

SYSTEM AND METHOD FOR PROVIDING A CONDUIT SEALINGLY TO A THROUGH-OPENING IN A PLATE-SHAPED CONSTRUCTION ELEMENT

CROSS-REFERENCE TO RELATED APPLICATIONS

This application is a national stage filing under 35 U.S.C. § 371 of International Application No. PCT/EP2018/075538, filed Sep. 20, 2018, which claims priority to Netherlands Application NL 2019583, filed Sep. 20, 2017, each of which is herein incorporated by reference in its entirety.

The present disclosure relates to a system for providing a conduit sealingly to a through-opening in a plate-shaped construction element; to a method for providing a conduit sealingly to a through-opening in a plate-shaped construction element, and to a conduit assembly comprising a conduit sealingly provided to a through-opening in a plate-shaped construction element.

BACKGROUND OF THE PRESENT DISCLOSURE

In the ship building and the building of off-shore constructions such as oil rigs, etc., walls between compartments, walls between compartments and the environment, ceilings and decks, are all usually made of metal plate-shaped construction elements. As pipes and/or cables need to extend from one compartment to the other, or from outside into a compartment, such metal plate-shaped construction elements are often provided with through-openings. These openings may be circular, elliptical, square or rectangular with rounded edges, and can in principle have any shape. For ensuring that a conduit is sealingly provided to a through-opening, the conduit is usually provided with a flange which can then be used for welding the conduit to or into the through-opening.

Welding requires skilled workers which are accordingly well-paid and thus costly. As these workers are during welding exposed to hazardous and relatively unhealthy conditions, welders are nowadays highly paid. In the world there is a shortage of good welders. Also this drives up the price for getting a welding job done. Not only does welding drive up the price of a construction, welding inherently changes locally the structure of the metal plate-shaped construction element, often introducing a weakness in the construction. Corrosion and/or fatigue may lead to tearing of welds. It is no surprise that alternative ways of providing a conduit to a through-opening in a plate-shaped construction element are of interest.

Mounting conduits to a plate-shaped construction element have equally been known in the art. It often requires the drilling of additional holes in the plate-shaped construction element around and at a slight distance from the through-opening. It often requires good planning, coordination and communication between workers, often down in the hull of a ship that is being built in a yard, where direct communication, or via transmission, may be problematic.

It is an object of the present disclosure to provide a simple system and method for providing a conduit sealingly to a through-opening in a plate-shaped construction element, that does not require communication between workers.

According to one aspect of the present disclosure, there is a system for providing a conduit sealingly to a through-opening in a plate-shaped construction element so that at least one pipe and/or cable can extend through the conduit and so that after sealing remaining space in the conduit a completely sealed off pipe and/or cable penetration through the plate-shaped construction element is obtained. The system is such that it is mechanically mountable. The system is further such that it is mountable from only one side of the plate-shaped construction element. Advantageously, it is much easier to communicate and coordinate the presence of workers as the workers can be at one side of the plate-shaped construction element. The system preferably comprises a conduit-part having a conduit for extending from and/or through the though-opening and having outside the conduit a circumferentially extending member for placement at a proximal side of the plate-shaped construction element parallel to a circumference of the through-opening. The system further preferably comprises an anchor-part for placement at a distal side of the plate-shaped construction element at a number of positions along a circumference of the through-opening. The system preferably also comprises at least one connecting element for connecting the circumferentially extending member of the conduit-part with the anchor-part. The anchor-part is preferably suitable for being put from the proximal side of the plate-shaped construction element, through the through-opening, at the distal side of the plate-shaped construction element. One of the at least one connecting element for connecting the circumferentially extending member of the conduit-part with the anchor-part preferably allows for placement of the anchor-part at the distal side of the plate-shaped construction element at the number of positions along a circumference of the through-opening whilst being connected to the conduit-part.

Advantageously, it is possible to position the anchor-part and the conduit-part at respectively the distal side and the proximal side by coordinating one positioning step that can be handled and carried out by one person. The at least one connecting part, or at least one element thereof already connects the anchor-part and the conduit part during that positioning.

Advantageously, the anchor-part cannot fall on the other side of the plate-shaped construction element before it is accurately positioned and tightly fixed to the conduit-part. This makes the system foolproof during mounting.

According to an example, the system is mountable by only one worker, who is operating from a proximal side of the plate-shaped construction element. Advantageously, there is no need at all for communicating between workers who together mount a single conduit in or to a through-opening in a plate-shaped construction element, as the job can be done by only one worker. This also heavily cuts the costs for getting the job done.

According to an example of the disclosure, the system is such that it is mountable without having to provide in addition to the through-opening further through-openings through the plate-shaped construction element. Thus, there is no need to drill additional holes and no need for power supply, making the job straightforward, and manageable by relatively unskilled workers.

According to a second aspect of the disclosure, there is a method for providing a conduit sealingly to a through-opening in a plate-shaped construction element so that at least one pipe and/or cable can extend through the conduit and so that after sealing the remaining space in the conduit a completely sealed-off pipe and/or cable penetration through the plate-shaped construction element is obtained. The method comprises mechanically mounting the conduit to the through-opening. The method further is such that it comprises mounting from only one side of the plate-shaped construction element. The method preferably comprises providing a conduit-part having a conduit for extending from and/or through the through-opening and having outside the conduit a circumferentially extending member for placement at a proximal side of the plate-shaped construction element parallel to a circumference of the through-opening. The method further preferably comprises providing an anchor-part for placement at a distal side of the plate-shaped construction element at a number of positions along a circumference of the through-opening. The method preferably also comprises providing at least one connecting element for connecting the circumferentially extending member of the conduit-part with the anchor-part. The method preferably comprises a step wherein the anchor-part is put from the proximal side of the plate-shaped construction element, through the through-opening, at the distal side of the plate-shaped construction element. The at least one connecting element for connecting the circumferentially extending member of the conduit-part with the anchor-part preferably allows for placement of the anchor-part at the distal side of the plate-shaped construction element at the number of positions along a circumference of the through-opening whilst being connected to the conduit-part. The advantages as outlined above for the system equally apply to the method.

According to an example of the second aspect, the method comprises mounting by only one worker, who is operating from a proximal side of the plate-shaped construction element. Again, the advantage put forward in relation to the corresponding example of the system, equally applies to the example of the method.

According to another example of the second aspect of the disclosure, the method is free from providing in addition to the through-opening further through-openings through the plate-shaped construction element. Also here it applies that the above-mentioned advantage for the corresponding system equally applies to the example of the second aspect of the disclosure.

According to a third aspect of the invention there is provided a conduit assembly comprising a conduit sealingly provided to a through-opening in a plate-shaped construction element so that at least one pipe and/or cable can extend through the conduit and so that after sealing the remaining space in the conduit a completely sealed-off pipe and/or cable penetration through the plate-shaped construction element is obtained. The conduit has mechanically been mounted to the through-opening, without having had a need to provide in addition to the through-opening further through-openings through the plate-shaped construction element. The assembly preferably comprises a conduit-part having a conduit extending from and/or through the though-opening and having outside the conduit a circumferentially extending member placed at a proximal side of the plate-shaped construction element parallel to a circumference of the through-opening. The assembly further preferably comprises an anchor-part that is placed at a distal side of the plate-shaped construction element at a number of positions along a circumference of the through-opening. The assembly preferably also comprises at least one connecting element that connects the circumferentially extending member of the conduit-part with the anchor-part. The anchor-part itself is preferably suitable for being put through from the proximal side of the plate-shaped construction element, through the through-opening, at the distal side of the plate-shaped construction element.

The disclosure and advantages thereof are by means of non-limiting examples further described and explained, with reference to the drawing in which.

In the drawing, like parts are referred to by like references.

Figure 1:
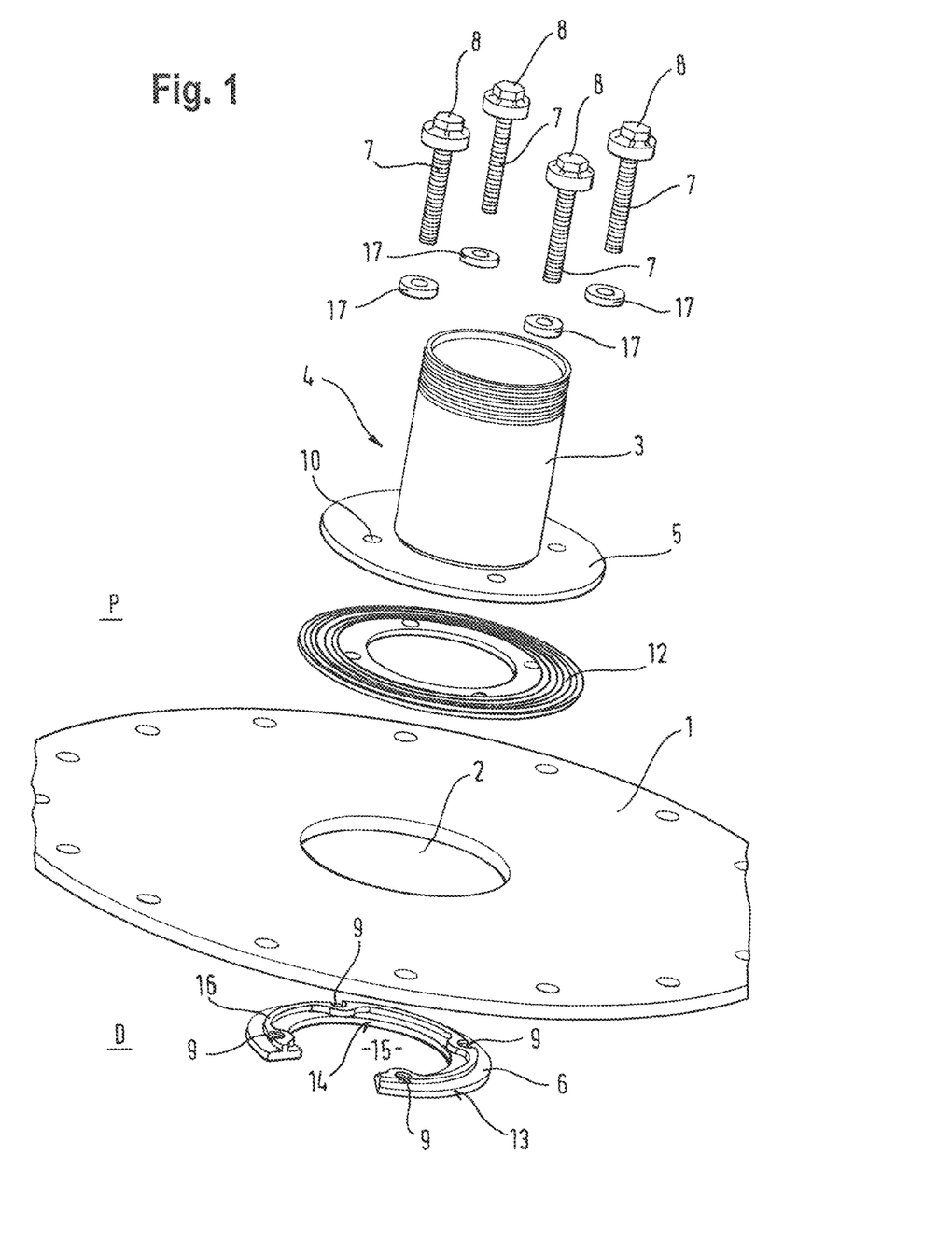
FIG. 1 shows an exploded perspective view of an example of the present disclosure.

FIG. 1 shows a plate-shaped construction element 1 having a through-opening 2. For the purpose of clarity, the plate-shaped construction element 1 is shown to be a circular element. However, in practice such a plate-shaped construction element is often a part of a wall in a metal construction such as a vessel or an oil platform. The plate-shaped construction element may have any further shape and be any part of a construction. FIG. 1 shows a conduit 3. Apart from the plate-shaped construction element 1, the parts shown in FIG. 1 are each part of an example of a system for providing a conduit sealingly to the through-opening 2 in the plate-shaped construction element 1, so that at least one pipe and/or cable can extend through the conduit 3 and so that after sealing the remaining space in the conduit 3 a completely sealed-off pipe and/or cable penetration through the plate-shaped construction element 1 can be obtained. As noticeable in FIG. 1, the system is such that it is mechanically mountable. Without further explanation it is perhaps not noticeable from FIG. 1 that the system is further such that it is mountable from only one side of the plate-shaped construction element. A further explanation on this point will follow below. It may equally not be noticeable from FIG. 1 that the system is mountable by only one worker, who is operating from a proximal side of the plate-shaped construction element 1. Throughout the present disclosure, the proximal side P will be the side from which the single worker will be operating when mounting the conduit 3 to the through-opening 2. The distal side is the other side of the plate-shaped construction element.

Figure 6:
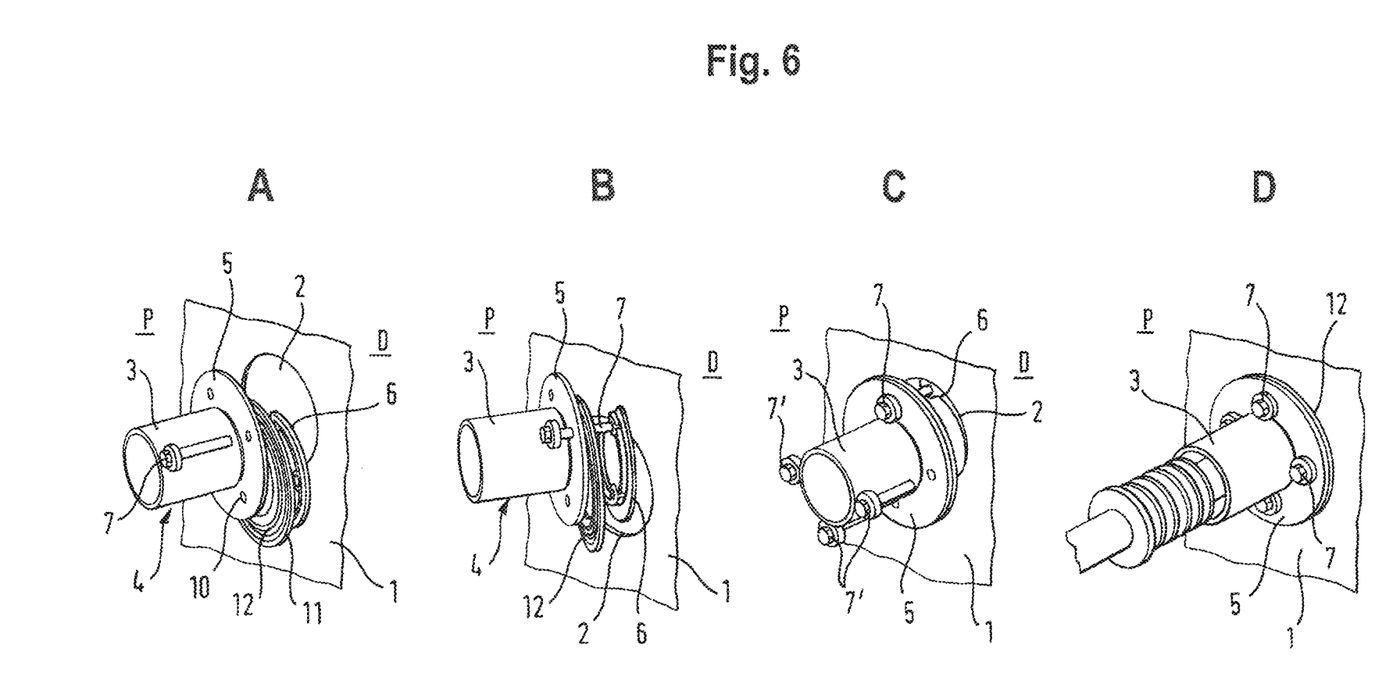
FIG. 6 shows four steps of an example of a method according to the present disclosure.

The system comprises a conduit part 4 having the conduit 3 for extending from and/or through the through-opening 2 and having outside the conduit 3 a circumferentially extending member 5 for placement at the proximal side P of the plate-shaped construction element 1 parallel to a circumference of the through-opening 2. Most of the circumferentially extending members will simply be a flange 5 that is connected to conduit 3, as shown in FIG. 1. The system further comprises an anchor part 6 for placement at a distal side D of the plate-shaped construction element at a number of positions along a circumference of the through-opening 2. The system further comprises at least one connecting element 7 for connecting the circumferentially extending member 5 of the conduit part 4 with the anchor part 6. In most examples, the connecting parts will be bolts, having threads, and will have a head 8 for coupling to a tool that can swiftly rotate a connecting element 7 around its axis. The threaded end of the bolt is ideally connected to through-hole 9 that is equally threaded and in the anchor-part 6. That connecting element then preferably equally extends through through-holes in gasket 17, and flange 10 and through a through-hole in sealing gasket 12. That one of the connecting elements 7 for connecting the circumferentially extending member 5 of the conduit part 4 with the anchor part 6 allows for placement of the anchor part 6 at the distal side D of the plate-shaped construction element 1 at a number of positions along a circumference of the through-opening 2 whilst being connected to the conduit part 4. For visualizing this, the reader is referred to image A, B and C in FIG. 6. Image A and B show that the anchor part 6 is connected by connecting element 7 to conduit part 4. In image C it is shown that the connecting element 7 already shown in image D already connects anchor part 6 while that anchor part 6 is placed at the distal side D of the plate-shaped construction element 1. Other connecting elements 7, each here referred to as connecting element 7', are during the time that the anchor part 6 is placed at the distal side D of plate-shaped construction element 1 are at that moment in time not yet connecting circumferentially extending member 5 and anchor part 6. Clearly, each of the at least one connection elements 7, 7' is suitable for bringing the conduit part 4 at the proximal side P of the plate-shaped construction element 1 parallel to a circumference of the through-opening 2 whilst bringing or keeping the anchor part 6 at the number of positions along a circumference of the through-opening 2 at the distal side D of the plate-shaped construction element 1. As a result thereof the plate-shaped construction element 1 can be "clamped in" by the conduit part 4 and the anchor part 6. In practice, this "clamping-in" of the plate-shaped construction element occurs by rotating each of the connecting elements (in this example each bolt) around its axis 7, 7'. The sequence of events as shown in FIG. 6, particularly image A, B and C is that first one connecting element 7 is put through a through-hole in circumferentially extending member 5, put through a through-hole in a sealing gasket 11, and then put in a through-hole 9 of anchor part 6. (It is assumed that sealing gasket 17 had already been placed in a seat in head 8). Then, as shown in image B of FIG. 6, whilst being connected, anchor part 6 is put through the through-opening 2 and placed at the distal side D of the plate-shaped construction element 1. Then the other connecting elements 7' are equally inserted in through-holes 10, 12 and 9 (which are then put in alignment relative to each other) and the conduit part 4 and anchor part 6 are brought together by rotating each of connecting elements 7, 7' around its axis. It is possible that only one connecting element at the time is being rotated. The entire mounting of the conduit 3 to the through-opening 2 can be done from only one side of the plate-shaped construction element 1. It is further clear that the mounting can be done by only one worker, who is operating from the proximal side P.

Anchor part 6 is suitable for being put from the proximal side P of the plate-shaped construction element 1 through the through-opening 2, at the distal side D of the plate-shaped construction element 1. In the example shown, anchor part 6 is C-shaped or U-shaped. It is equally possible that anchor part 6 can adopt a C- or U-shape.

Figure 2:
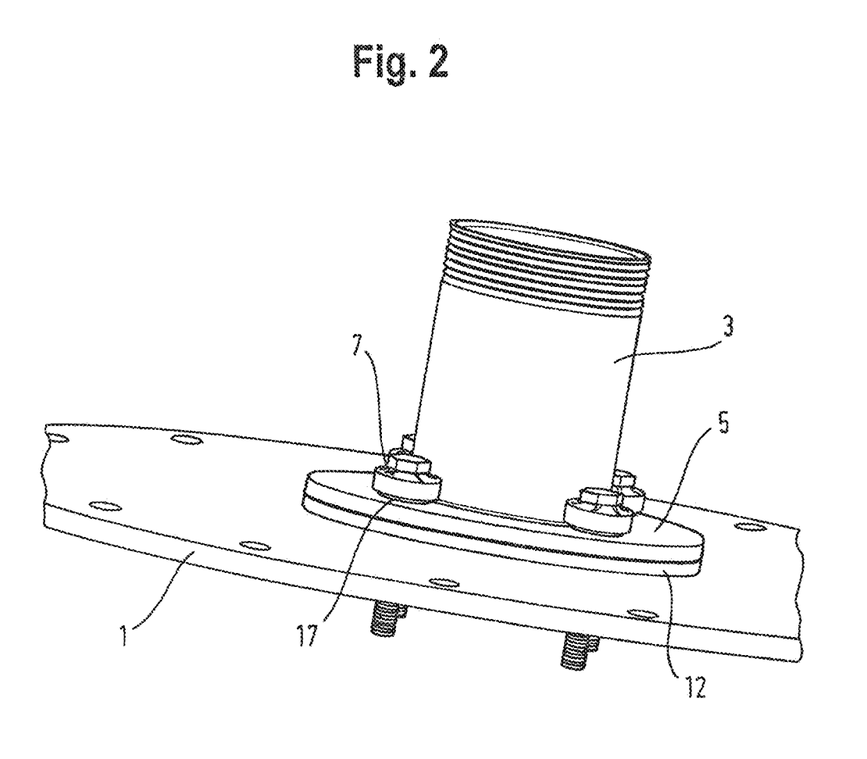
FIG. 2 shows an example of the present disclosure in mounted condition.
Figure 3:
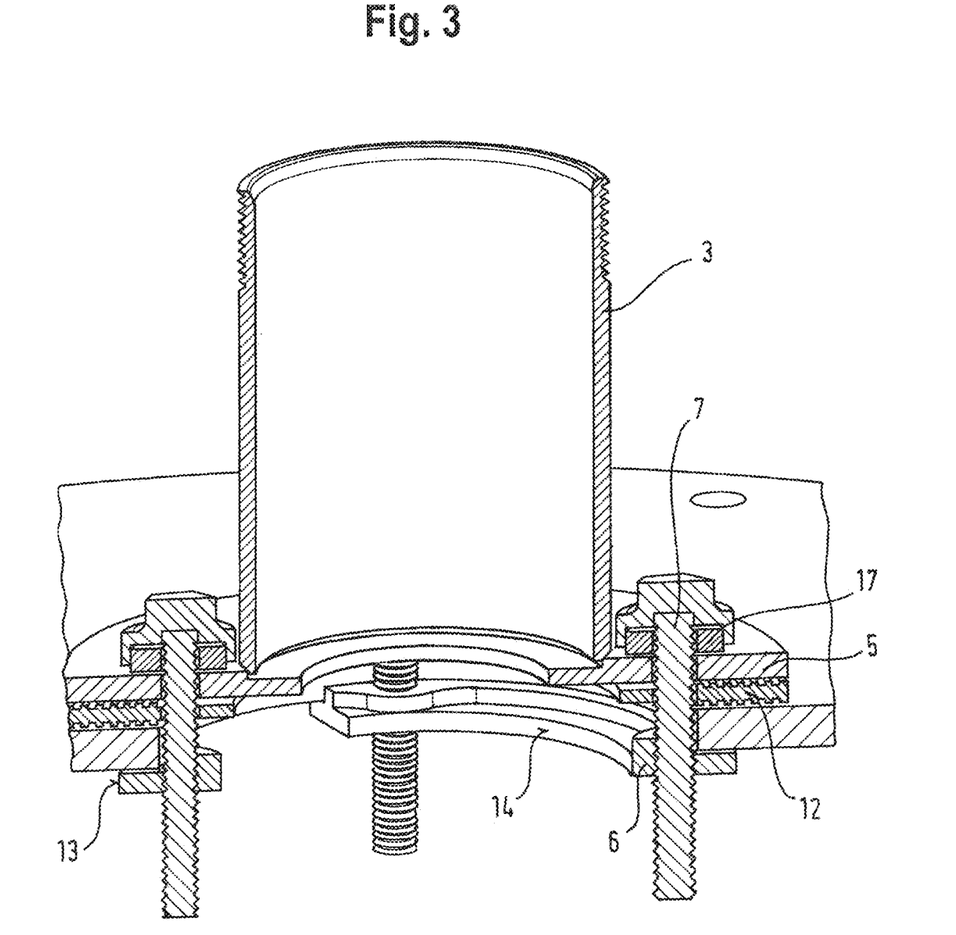
FIG. 3 shows a semi-cross sectional and semi-exploded view of an example of the present disclosure in mounted condition.
Figure 4:
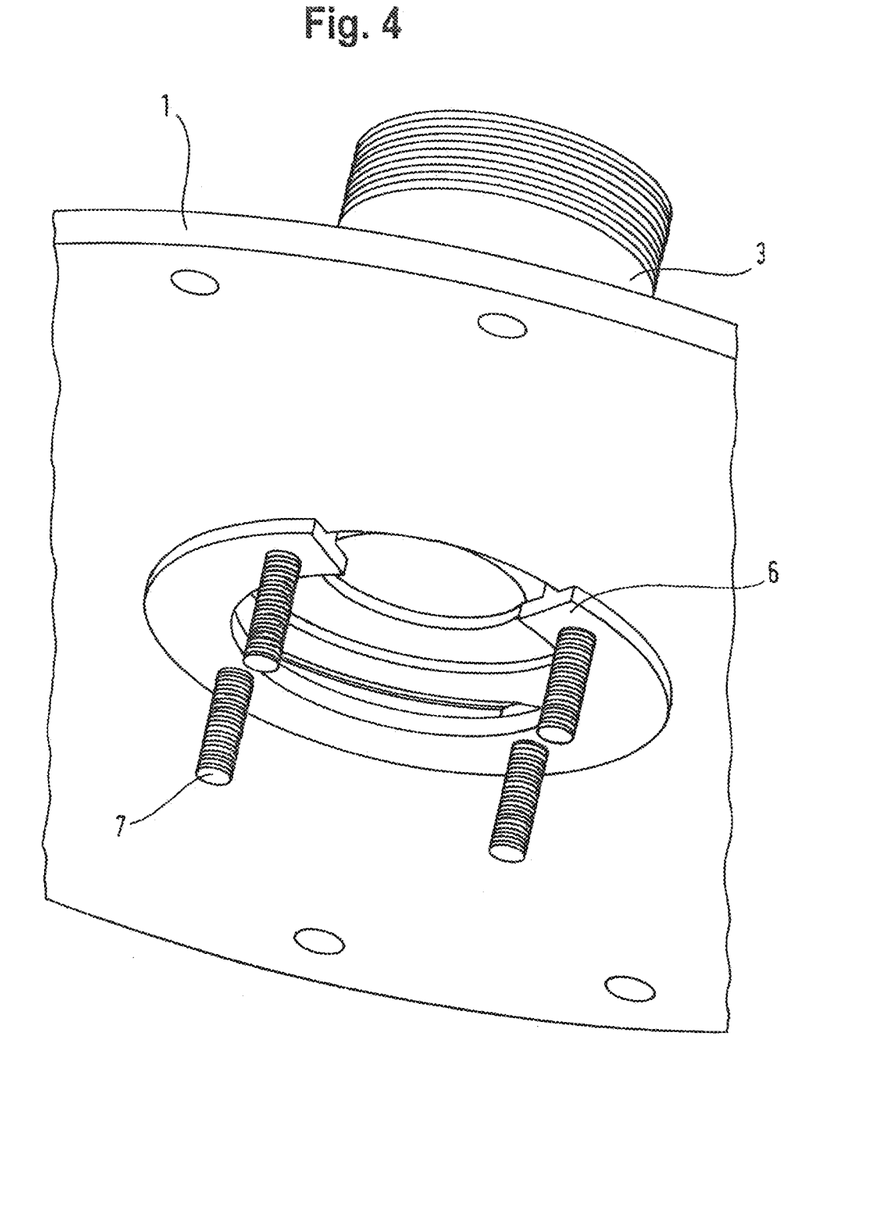
FIG. 4 another view of the example shown in FIG. 2.
Figure 5A:
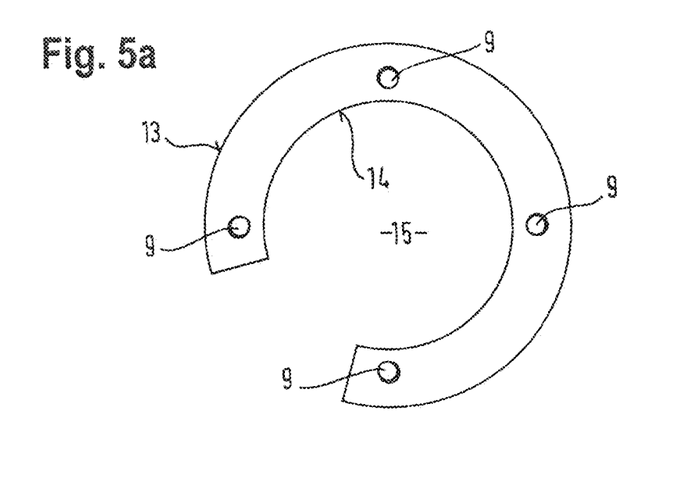
FIG. 5a an example of a part of the system of the present disclosure.
Figure 5B:
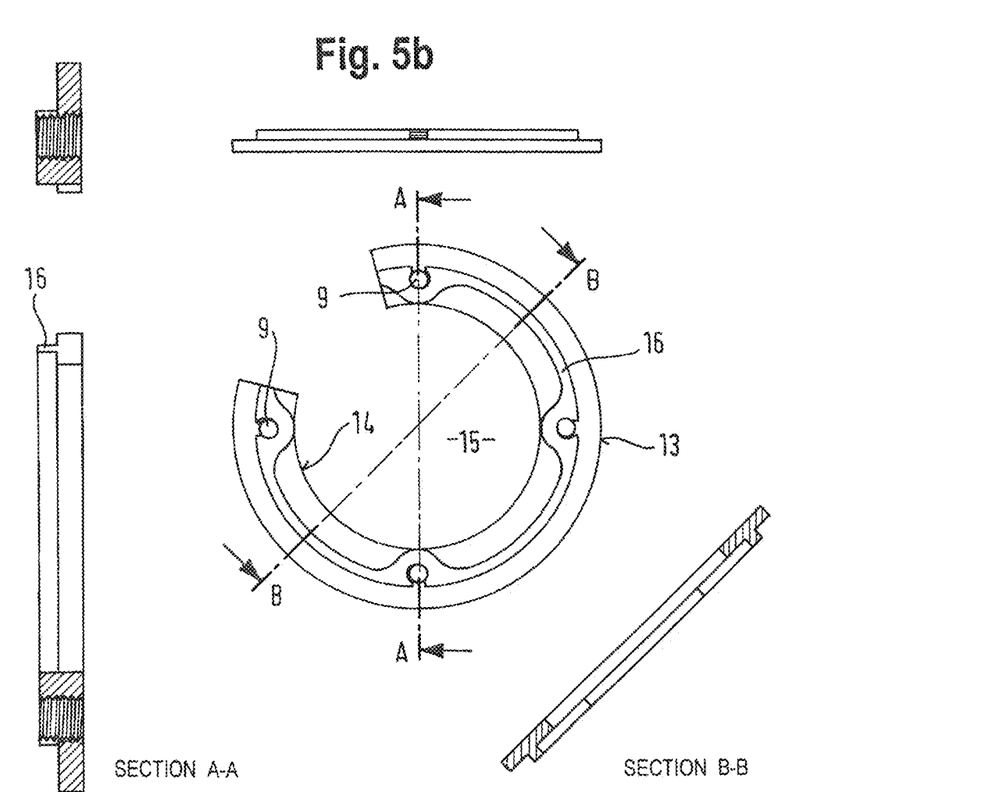
FIG. 5b the part shown in FIG. 5a viewed from another side, as well as cross-sectional views as indicated.

For further assisting visualization of the conduit as provided sealingly to the through-opening 2, reference is made to FIGS. 2, 3 and 4.

We now turn to preferred features of anchor part 6. Preferably anchor part 6 has an outer contour 13 defined by the most outer dimensions of the anchor part 6. Anchor part 6 preferably also has an inner contour 14 defining free space 15. The anchor part 6 has between the outer contour 13 and the inner contour 14, and preferably closer to the inner contour, 14 at least one connecting part 9 for connecting via at least one of the connecting elements 7 with a part of the conduit part 4 that is outside the inner circumference of the conduit 3. Ideally, this is such that in a mounted condition of the system the conduit 3 can be in the free space 15 of the anchor part 6 or such that in a mounted condition of the system an imaginary extension of the conduit 3 in an axial direction thereof can be in the free space 15 of the anchor part 6.

The anchor part 6 is preferably provided with a fixator for at least temporarily fixating the anchor part 6 against the distal side D of the plate-shaped construction element 1 at a number of positions along a circumference of the through-opening 2, optionally before connecting the anchor part 6 and the conduit part 4. The number of positions may be limited to one. The fixator may be self-clamping into the through-opening 2. The fixator may also comprise at least one lip 16 which may preferably be hook-shaped so as to allow the anchor part 6 to hang on a rim of the through-opening 2. Alternatively, or additionally, the fixator may comprise an adhesive tape, or a glue. It is preferable that the fixator comprises a lip 16, as this allows for some movement along the circumference of the through-opening 2 whilst the conduit part 4 and the anchor part 6 are brought together to "clamp-in" the plate-shaped construction element 1. However, the present disclosure envisages that such a fixation is not necessary in view of the one connecting element 7 that connects the anchor-part and the conduit part whilst putting the anchor-part through the through-opening at the distal side of the plate-shaped construction element.

Preferably, the anchor part 6 is such that it can be positioned at the distal side D of the plate-shaped construction element 1 in a stable position relative to the plate-shaped construction element, such that it is connectable or connected to the conduit part 4 when that conduit part 4 is positioned at the proximal side P of the plate-shaped construction element 1 parallel to a circumference of the through-opening 2. Thus, optionally, anchor part 6 is first put through the through-opening 2 and then positioned such that it is stable and can be connected to the conduit part 4. Alternatively, and preferably, anchor part 6 and conduit part 4 are connected before putting anchor part 6 through the through-opening 2 for placement at the distal side D parallel to a circumference of the through-opening 2. Connecting before putting through the through opening has the advantage that the anchor-part cannot fall down at the distal side D.

It has turned out to be unnecessary to provide for dedicated means for blocking rotation of the anchor-part when only one connecting element is rotated for bringing the anchor-part and the conduit part together after initial placement at the respective sides of the plate-shaped construction element. As soon as the anchor-part is somewhat firmly placed against the plate-shaped construction element, no rotation of the anchor-part will take place, allowing for advancing the connecting element such that the distance between the anchor-part and the conduit-part reduces. A handy worker can easily mount the system on his/her own. On the other hand, it remains possible to apply a rotation blocker. The anchor-part itself is not necessarily put at the distal side in a sealing fashion, as sealing can be established up to completion at the proximal side.

Further, examples of a system of the present disclosure are such that these are mountable without having to provide in addition to the through-opening further through-openings through the plate-shaped construction element. Put simply, this is possible when the bolts extend through the through-opening 2 in the plate-shaped construction element, so that no special through-holes need to be provided in the plate-shaped construction element 1.

Attention is now given to features that allow for providing the conduit 3 to the through-opening 2 sealingly. For that purpose the circumferentially extending member 5 of the conduit part 4 comprises a first seat for a sealing gasket 12 for positioning between the plate-shaped construction element and the conduit part 4. In the examples discussed, the seat comprises an annular-shaped cavity in the circumferentially extending member 5 for hosting this sealing gasket. The thickness of the sealing gasket 12 is such that no matter how tight the conduit part 4 and the anchor part 6 clamped in plate-shaped construction element 1, conduit part 4, or in any case the circumferentially extending member 5 thereof, will not be touching plate-shaped construction element 1.

Each of the at least one connecting elements 7 have in their heads a second seat for a second sealing gasket 17. Ideally, in use this head is at a side that will remain in use at a proximal side P of the plate-shaped construction element 1. Then the second sealing gasket 17 can be positioned against the circumferentially extending member 5 when the conduit part 4 and the anchor part 6 are brought together for "clamping in" the plate-shaped construction element 1. The second seat preferably comprises an annular-shaped cavity for hosting the sealing gasket 17. The thickness of the sealing gasket 17, in relation to the shape and dimensions of the second seat, are such that the seat does not touch the circumferentially extending member 5 of the conduit part 4, not even when the conduit part 4 and anchor part 6 tightly clamp in plate-shaped construction element 1.

As explained above, a method for providing a conduit sealingly to a through-opening 2 in a plate-shaped construction element 1 can be such that it comprises mounting from only one side of the plate-shaped construction element 1. However, if so desired, as shown in FIGS. 2, 3 and 4, the threaded ends of the bolts sticking out on the distal side D can of course be provided with a capped nut (not shown) or any other device that further secures the conduit as mounted and that prevents people from being injured by those ends when getting too close and accidentally hitting those ends of the bolts. This however is not a necessary part of the mounting itself and can be done afterwards.

As can be seen in particular in FIG. 3, the disclosure provides a conduit assembly that has mechanically been mounted to a through-opening 2 in a plate-shaped construction element 1 without having had to provide in addition to the through-opening 2 further through-openings through the plate-shaped construction element 1.

Although so far the present disclosure referred predominantly to conduits having a circular cross section, the technical concept of the disclosure, as captured by the appended claims, also allows for application with conduits having non-circular cross sections. Thus, the conduit may be elliptical, rectangular, having rounded edges, or have any other shape. In those situations, the anchor part 6 can probably always be closed in itself and still be put from the proximal side of the plate-shaped construction element 1, through the through-opening 2, to the distal side D. In those circumstances the anchor-part 6 can abut at the entire circumference of the though-opening 2 the plate-shaped element 1. Only where the conduit has a circular cross-section, it may be necessary to have a C- or U-shaped anchor part 6. As indicated, it may also be possible to have an anchor part 6 that can adopt a C- or U-shape. For instance, the anchor part 6 may be composed of segments of a circle which are connected by means of hingeable connections, so that some of the segments can be moved radially inwardly and thus so that the anchor part 6 overall adopts temporarily a C- or U-shape. In that condition the anchor part can be put through the circular through-opening 2.
Y In the example as discussed, it is the number of the connecting elements and the length of each thereof that allows for the mounting by a single worker from only one side. It requires a bit of training to straightforwardly mount the system. However, a handy worker can for sure, after some training, routinely mount the system, even in circumstances where little light is available. In other words, with just the availability of a battery holding electrical driver for rotating the connecting elements, it is possible to use the system and successfully mount it, without having electrical wires around. No other parts or tools are required. Instead of 4 connecting elements, it is also possible to use only 2 connecting elements, or to use 5 or 6 and even more, depending on the diameter of the conduit. Indeed, many other examples are possible within the framework of the claims as appended.

The invention claimed is:

1. A system for providing a conduit sealingly to a through-opening in a plate-shaped construction element so that at least one pipe and/or cable can extend through the conduit and so that after sealing remaining space in the conduit a completely sealed-off pipe and/or cable penetration through the plate-shaped construction element is obtained,
   wherein the system is such that it is mechanically mountable,
   wherein the system is further such that it is mountable from only one side of the plate-shaped construction element,
   wherein the system comprises:
   a conduit-part having a conduit for extending from and/or through the through-opening and having outside the conduit a circumferentially extending member for placement at a proximal side of the plate-shaped construction element parallel to a circumference of the through-opening;
   an anchor-part for placement at a distal side of the plate-shaped construction element at a number of positions along the circumference of the through-opening, wherein the anchor-part includes a first end, a second end, and a gap between the first end and the second end; and
   at least one connecting element for connecting the circumferentially extending member of the conduit-part with the anchor-part,
   wherein the anchor-part is suitable for being put from the proximal side of the plate-shaped construction element, through the through-opening, at the distal side of the plate-shaped construction element,
   wherein one of the at least one connecting element for connecting the circumferentially extending member of the conduit-part with the anchor-part allows for placement of the anchor-part at the distal side of the plate-shaped construction element at the number of positions along the circumference of the through-opening whilst connected to the conduit-part,
   wherein whilst connected to the conduit-part, the anchor-part is configured to be put through the through-opening and placed at the distal side of the plate-shaped construction element.

2. The system according to claim 1, wherein the system is mountable by only one worker, who is operating from the proximal side of the plate-shaped construction element.

3. The system according to claim 1, wherein the at least one connecting element is suitable for bringing the conduit-part at the proximal side of the plate-shaped construction element parallel to the circumference of the through-opening whilst bringing or keeping the anchor-part at the number of positions along the circumference of the through-opening at the distal side of the plate-shaped construction element, so that the plate-shaped construction element can be clamped in by the conduit-part and the anchor-part.

4. The system according to claim 1, wherein the anchor-part is a single-part device.

5. The system according to claim 1, wherein the anchor-part is C or U shaped.

6. The system according to claim 1, wherein the anchor-part has an outer contour defined by the most outer dimensions of the anchor-part and an inner contour defining free space, the anchor-part having between the outer contour and the inner contour close to the inner contour at least one connection part for connecting via at least one of the at least one connecting element with a part of the conduit-part that is outside an inner circumference of the conduit so that when the system is in a mounted condition the conduit can be in the free space of the anchor-part or an imaginary extension of the conduit in an axial direction thereof can be in the free space of the anchor-part.

7. The system according to claim 1, wherein the circumferentially extending member of the conduit-part comprises a first seat for a sealing gasket for positioning between the plate-shaped construction element and the conduit-part.

8. The system according to claim 1, wherein each of the at least one connecting element is at a side that will remain in use at the proximal side of the plate-shaped construction element provided with a second seat for a second sealing gasket for positioning against the circumferentially extending member when the conduit-part and the anchor-part are brought together for clamping in between the plate-shaped construction element.

9. The system according to claim 8, wherein each second seat comprises an annularly shaped cavity for hosting the second sealing gasket.

10. The system according to claim 1, wherein the anchor-part is provided with a fixator for at least temporarily fixating the anchor-part against the distal side of the plate-shaped construction element at a number of positions along the circumference of the through-opening.

11. The system according to claim 10, wherein the fixator is configured to clamp into the through-opening.

12. The system according to claim 10, wherein the fixator comprises at least one lip, wherein the at least one lip is hook-shaped so as allow the anchor-part to hang on a rim of the through-opening.

13. The system according to claim 10, wherein the fixator comprises adhesive tape or a glue.

14. The system according to claim 1, wherein the anchor-part is such that it can in a stable position be positioned at the distal side of the plate-shaped construction element whilst it is connected to the conduit-part when that is positioned at the proximal side of the plate-shaped construction element parallel to the circumference of the through-opening.

15. A method for providing a conduit sealingly to a through-opening in a plate-shaped construction element so that at least one pipe and/or cable can extend through the conduit and so that after sealing the remaining space in the conduit a completely sealed-off pipe and/or cable penetration through the plate-shaped construction element is obtained,
wherein the method comprises mechanically mounting the conduit to the through-opening,
and wherein the method is further such that it comprises mounting from only one side of the plate-shaped construction element,
wherein the method further comprises:
providing a conduit-part having a conduit for extending from and/or through the through-opening and having outside the conduit a circumferentially extending member for placement at a proximal side of the plate-shaped construction element parallel to a circumference of the through-opening;
wherein the method further comprises providing an anchor-part for placement at a distal side of the plate-shaped construction element at a number of positions along the circumference of the through-opening, wherein the anchor-part includes a first end, a second end, and a gap between the first end and the second end;
wherein the method further comprises:
providing at least one connecting element for connecting the circumferentially extending member of the conduit-part with the anchor-part,
wherein the method comprises a step wherein the anchor-part is put from the proximal side of the plate-shaped construction element, through the through-opening, at the distal side of the plate-shaped construction element, wherein the at least one connecting element for connecting the circumferentially extending member of the conduit-part with the anchor-part, allows for placement of the anchor-part at the distal side of the plate-shaped construction element, at the number of positions along the circumference of the through-opening whilst connected to the conduit-part,
wherein whilst connected to the conduit-part, the anchor-part is put through the through-opening and placed at the distal side of the plate-shaped construction element.

16. The method according to claim 15, wherein the method comprises mounting by only one worker, who is operating from the proximal side of the plate-shaped construction element.

17. The method according to claim 15, wherein the method comprises bringing the conduit-part at the proximal side of the plate-shaped construction element parallel to the circumference of the through-opening whilst bringing or keeping the anchor-part at the number of positions along the circumference of the through-opening at the distal side of the plate-shaped construction element, so that the plate-shaped construction element can be or is clamped in by the conduit-part and the anchor-part.

18. The method according to claim 15, wherein the anchor-part is a single-part device.

19. The method according to claim 15, wherein the anchor-part is C or U shaped.

20. The method according to claim 15, wherein the anchor-part has an outer contour defined by the most outer dimensions of the anchor-part and an inner contour defining free space, the anchor-part having between the outer contour and the inner contour close to the inner contour at least one connection part for connecting via at least one of the at least one connecting element with a part of the conduit-part that is outside an inner circumference of the conduit, wherein the mounting of the conduit to the through-opening comprises putting the conduit in the free space of the anchor-part or putting the conduit such that an imaginary extension of the conduit in an axial direction thereof is in the free space of the anchor-part.

21. The method according to claim 15, wherein the method comprises positioning a first sealing gasket between the plate-shaped construction element and the conduit-part.

22. The method according to claim 15, wherein the method comprises providing between each of the at least one connecting element at a side that will remain in use at the proximal side of the plate-shaped construction element and the circumferentially extending member a second sealing gasket when the conduit-part and the anchor-part are brought together for clamping in between the plate-shaped construction element.

23. The method according to claim 22, wherein the method comprises providing the second sealing gasket in a second seat for positioning the second sealing gasket against the circumferentially extending member when the conduit-part and the anchor-part are brought together for clamping in between the plate-shaped construction element.

24. The method according to claim 23, wherein each second seat comprises an annularly shaped cavity for hosting the second sealing gasket.

25. The method according to claim 24, wherein the method comprises at least temporarily fixating the anchor-part against the distal side of the plate-shaped construction element at a number of positions along the circumference of the through-opening, before connecting the anchor-part and the conduit-part.

26. The method according to claim 25, wherein the method comprises clamping the anchor-part into the through-opening.

27. The method according to claim 25, wherein the method comprises fixing the anchor-part around or to a rim of the through-opening at the distal side of the plate-shaped construction element.

28. The method according to claim 25, wherein the method comprises providing a fixator which comprises adhesive tape, a glue or at least one lip, wherein the at least one lip is hook-shaped so as allow the anchor-part to hang on a rim of the through-opening.

29. The method according to claim 15, wherein the method comprises positioning the anchor-part in a stable position at the distal side of the plate-shaped construction element whilst the anchor-part is connected to the conduit-part when the conduit-part is positioned at the proximal side of the plate-shaped construction element parallel to the circumference of the through-opening.

30. A conduit assembly comprising a conduit sealingly provided to a through-opening in a plate-shaped construction element so that at least one pipe and/or cable can extend through the conduit and so that after sealing remaining space in the conduit a completely sealed-off pipe and/or cable penetration through the plate-shaped construction element is obtained, wherein the conduit has mechanically been mounted to the through-opening, without having to provide in addition to the through-opening further through-openings through the plate-shaped construction element, wherein the conduit assembly comprises:

a conduit-part having a conduit extending from and/or through the through-opening and having outside the conduit a circumferentially extending member placed at a proximal side of the plate-shaped construction element parallel to a circumference of the through-opening;

an anchor-part that is placed at a distal side of the plate-shaped construction element at a number of positions along the circumference of the through-opening, wherein the anchor-part includes a first end, a second end, and a gap between the first end and the second end; and at least one connecting element that connects the circumferentially extending member of the conduit-part with the anchor-part, wherein the anchor-part is suitable for being put from the proximal side of the plate-shaped construction element, through the through-opening, at the distal side of the plate-shaped construction element at the number of positions along the circumference of the through-opening whilst connected to the conduit-part, wherein whilst connected to the conduit-part, the anchor-part is configured to be put through the through-opening and placed at the distal side of the plate-shaped construction element.

31. The conduit assembly according to claim 30, wherein the conduit has been mounted such that it was possible to mount from the proximal side of the plate-shaped construction element, and by only one worker.

32. The conduit assembly according to claim 30, wherein the anchor-part is a single-part device.

33. The conduit assembly according to claim 30, wherein the anchor-part is C or U shaped.

34. The conduit assembly according to claim 30, wherein the anchor-part has an outer contour defined by the most outer dimensions of the anchor-part and an inner contour defining free space, the anchor-part having between the outer contour and the inner contour close to the inner contour a connection part that connects via at least one of the at least one connecting element with a part of the conduit-part that is outside an inner circumference of the conduit so that the conduit is in the free space of the anchor-part or an imaginary extension of the conduit in an axial direction thereof is in the free space of the anchor-part.

35. The conduit assembly according to claim 30, wherein the circumferentially extending member of the conduit-part comprises a first seat holding a sealing gasket which is positioned between the plate-shaped construction element and the conduit-part.

36. The conduit assembly according to claim 30, wherein each of the at least one connecting element is at a side that will remain in use at the proximal side of the plate-shaped construction element provided with a second seat holding a second sealing gasket which is positioned against the circumferentially extending member.

37. The conduit assembly according to claim 36, wherein the second seat comprises an annularly shaped cavity in for hosting the second sealing gasket.

38. The conduit assembly according to claim 36, wherein the anchor-part is provided with a fixator that at least temporarily fixates the anchor-part against the distal side of the plate-shaped construction element at a number of positions along the circumference of the through-opening.

39. The conduit assembly according to claim 38, wherein the fixator is configured to clamp into the through-opening.

40. The conduit assembly according to claim 38, wherein the fixator comprises at least one lip, wherein the at least one lip is hook-shaped so as allow the anchor-part to hang on a rim of the through-opening.

41. The conduit assembly according to claim 38, wherein the fixator comprises adhesive tape or a glue.

* * * * *